Feb. 3, 1970     M. L. SPEARMAN     3,493,197
TRANSLATING HORIZONTAL TAIL
Filed March 5, 1968
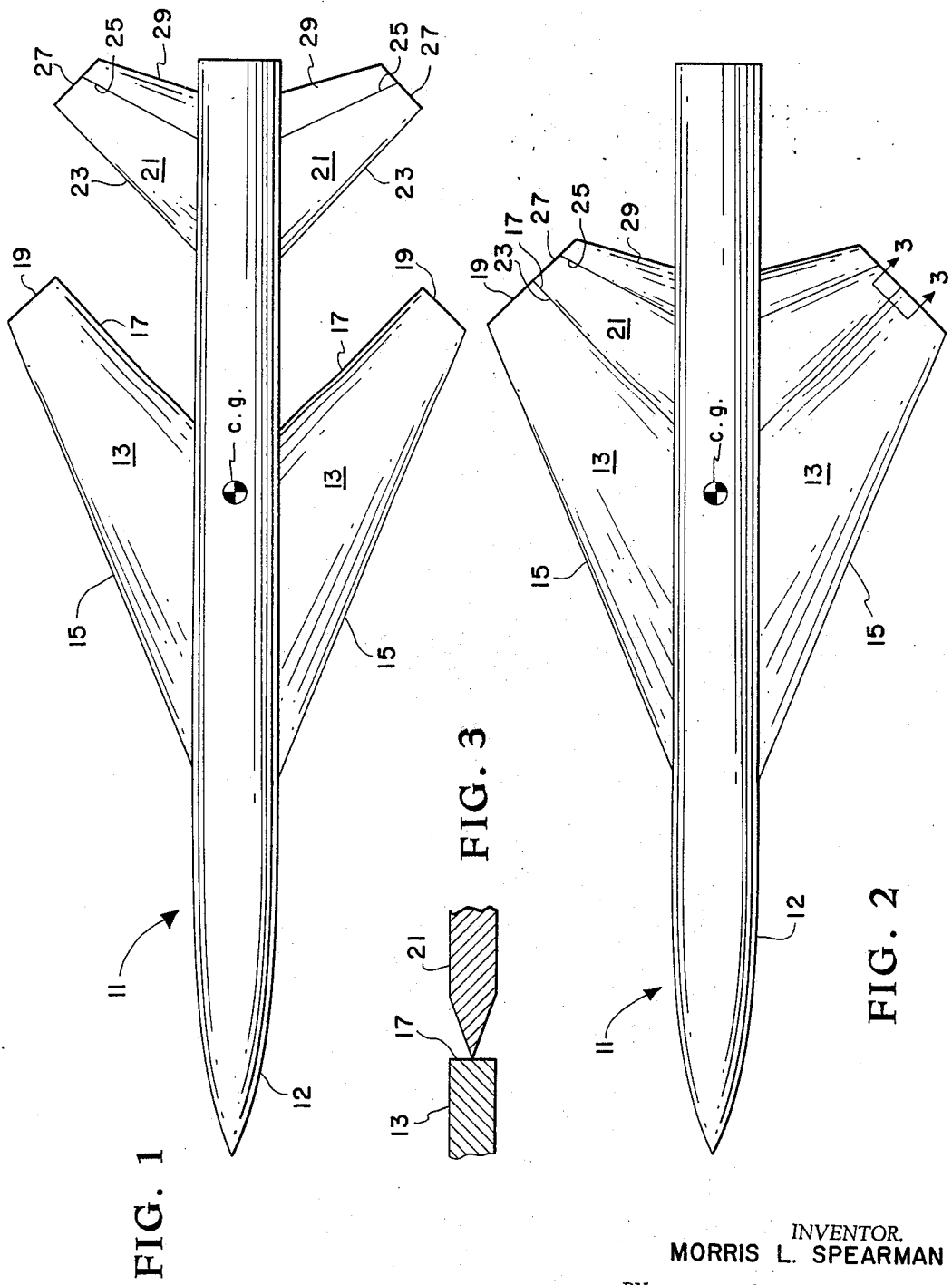
INVENTOR.
MORRIS L. SPEARMAN
BY
ATTORNEYS

3,493,197
TRANSLATING HORIZONTAL TAIL
Morris L. Spearman, Newport News, Va., assignor to the United States of America as represented by the Administrator of the National Aeronautics and Space Administration
Filed Mar. 5, 1968, Ser. No. 710,533
Int. Cl. B64c 3/54, 9/08
U.S. Cl. 244—43                                    7 Claims

ABSTRACT OF THE DISCLOSURE

An aircraft having both supersonic and subsonic flight capabilities which utilizes a translating horizontal tail to vary the aircraft geometry when changing from subsonic to supersonic speeds and vice versa.

---

The invention described herein was made by an employee of the United States Government and may be manufactured and used by or for the Government of the United States of America for governmental purposes without the payment of any royalties thereon or therefor.

This invention relates generally to aerial vehicles, and relates with particularity to supersonic aircraft having excellent subsonic flight capabilities and utilizing a translating horizontal tail to vary the aircraft geometry. One of the major problems associated with the design of supersonic airplanes is the variation of longitudinal stability and control with Mach number. The purpose of the translating horizontal tail of the present invention is to provide a means of counteracting the variation of longitudinal stability and control with Mach number that generally occurs with cruise or fighter-type aircraft and thereby tend to maximize the vehicle maneuver performance both at subsonic and supersonic speeds. The variation generally encountered consists of a substantial increase in longitudinal stability in going from subsonic to supersonic speeds with an attendant loss in maneuvering capability. Factors contributing to this increase in stability are (1) a rearward shift of the wing center of pressure, (2) the carry-over lift from the wing to the afterbody, (3) the decrease in subsonic downwash induced at the horizontal tail and (4) the deployment of supersonic upwash. Possible alleviation of the problem lies in minimization of the aerodynamic effects involved or in geometrically altering the aircraft as the Mach number is varied. Minimization of the aerodynamic effects implies the use of low aspect ratio lifting surfaces having inherently low values of lift curve slope and consequently little variation of lift with Mach number. However, a reduction in Mach number effects by such means is obtained at the expense of desirable lift and drag characteristics. Various systems for alleviating the Mach number effects by geometrically altering the aircraft have been used previously and include (1) folding wing tips of canard configuration, such as found in the B-70, (2) folding or free-floating canard surfaces, and (3) variable wing sweep.

These prior art systems have been suitable for the purposes intended but have generally resulted in a compromise in a design whereby some components of the aircraft are used efficiently only during a portion of the flight regime. A method of altering the aircraft geometry, as contemplated by the present invention, involves mechanical translation of the aft horizontal tail, in-flight, such that the tail is continuously used to provide lift, stability, and control, but in varying amounts depending on the tail longitudinal position. Thus, for low-speed flight, and for takeoff and landing, the tail is translated rearwardly to take maximum advantage of the tail moment arm in providing stability and control. For transonic and supersonic cruise flight, the tail is translated forward to a position directly behind the wing trailing edge. This tail translation brings the center of pressure forward in order to compensate for the increase in stability that occurs for fixed tail arrangements.

Accordingly, it is an object of the present invention to provide a new and improved variable geometry configuration for supersonic aircraft.

Another object of the present invention is the provision of a new and improved variable geometry aircraft with in-flight geometry variation being accomplished without adversely affecting the control and stability characteristics of the aircraft.

Another object of the present invention is a variable geometry aircraft of minimum mechanical complexity.

Another object of the present invention is a translating horizontal tail for supersonic aircraft.

According to the present invention, the foregoing and other objects are attained by providing, in a powered aircraft having a conventional supersonic fuselage including a swept fixed wing and fuselage carried propulsion engines, a translating horizontal tail movable from an aft to a forward position. The translating horizontal tail of the present invention is designed to be located substantially at the aft end of the aircraft fuselage during low-speed flight and movable to a position just aft of the fixed swept wing trailing edge for high speed or supersonic flight. Suitable control mechanism is provided in the aircraft fuselage for selectively translating the horizontal tail from its rearwardmost position to its forward position just aft of the aircraft wing.

A more complete appreciation of the invention and many of the attendant advantages thereof will be readily apparent as the same becomes better understood by reference to the following detailed description when considered in connection with the accompanying drawings wherein:

FIG. 1 is a bottom plan view of the variable geometry aircraft of the present invention with the horizontal tail thereof disposed in an aft subsonic cruise attitude;

FIG. 2 is a bottom plan view of the aircraft of FIG. 1 with the horizontal tail thereof disposed in a forward supersonic cruise attitude; and FIG. 3 is a section taken along lines 3—3 of FIG. 2 illustrating the connection between the fixed wing and the translating horizontal tail.

Referring now more particularly to the drawings wherein like reference numerals designate identical parts in each of the views, and more particularly in FIG. 1, there is shown a variable geometry planform aircraft generally designated by the reference numeral 11. Aircraft 11 is provided with a conventional fuselage 12 having a reaction propulsion motor system mounted therein, and which is proportional to have a length to equivalent diameter, or fineness ratio, suitable for supersonic flight.

Aircraft 11 is provided with a fixed swept wing 13 projecting outwardly from each side of fuselage 12. Each wing 13 includes a straight leading edge 15 and a straight trailing edge 17 which converge outwardly and rearwardly with respect to the adjacent side of the fuselage, toward a tip section 19 in a conventional manner. The empennage assembly of the present invention includes a horizontal tail 21 projecting from each side of fuselage 12. Horizontal tail 21 is provided with a straight leading edge 23 and a straight trailing edge 25 which converge outwardly and rearwardly, with respect to the adjacent side of the fuselage, toward a tip section 27. Suitable longitudinal control flaps or elevators 29 are located along the trailing edge 25 of tail 21. The tail leading edge 23 and the tail tip section 27 are constructed on the same angular arrangement as the wing trailing edge 17 and wing tip 19, respectively, so that when translating horizontal tail 21 is moved to the forward high-speed position these edges will merge with each other to form a continuous straight surface for wing 13 and tail 21. Suitable lift and control flaps for wing 13 are also considered a necessary part of aircraft 11, but are not shown in the interest of clarity.

Referring more particularly to FIG. 3, it is seen that tail 21 is adjacent to the blunt wing trailing edge 17 for supersonic flight and thus alleviates the wing base drag. The blunt trailing edge 17 provides sufficient strength and space for the installation of sophisticated high lift devices for low-speed flight.

During takeoff and climb to cruise altitude horizontal tail 21 would be in the aft position shown in FIG. 1. Upon the attainment of cruise altitude, tail 21 will be translated forwardly by suitable control mechanism, not shown, for acceleration of the aircraft through the transonic speed range to the cruise Mach number and, upon attainment of the cruise Mach number, the tail 21 will have been moved to the position shown in FIG. 2 so that wing 13 and tail 21 constitute a substantially continuous lift surface The control mechanism for tail 21 may be either mechanical, electrical, hydraulic or any combination of these as is conventional in movement of aerodynamic controls for aircraft. The control mechanism effects selective translation of tail 21 along suitable slotted surfaces (not shown) provided in the side wall of fuselage 12.

As mentioned hereinbefore, the primary purpose of the translating horizontal tail of the present invention is to counteract the variation of longitudinal stability and conrol with Mach number that generally occurs with cruise or fighter-type aircraft and thereby tend to maximize the vehicle maneuver performance both at subsonic and supersonic speed. After the supersonic flight plan or portion of the flight is completed, and it is desired to land the aircraft, translating horizontal tail 21 will be moved to the aft position shown at FIG. 1 to provide a more stable aircraft suitable for subsonic cruise and landing capabilities. The position of the tail in the mid or aft positions results in an increase in minimum drag while the position of the tail in the forward position (FIG. 2) results in a reduction in minimum drag and provides the highest values of maximum lift-drag ratio at supersonic speeds.

Obviously there are many modifications and variations of the present invention possible in the light of the above teachings. It is therefore to be understood that the invention may be practiced otherwise than as specifically described.

What is claimed as new and desired to be secured by Letters Patent of the United States is:

1. An aircraft having both supersonic and subsonic flight capabilities comprising:
    a fuselage,
    propulsion means carried by said fuselage,
    a fixed wing connected to each side of said fuselage and projecting substantially horizontally and outwardly therefrom,
    (a) each said wing having a straight leading edge swept outwardly and rearwardly with respect to the adjacent side of said fuselage,
    (b) each said wing having a substantially straight tip section extending from the leading edge extremity thereof inwardly and rearwardly with respect to the adjacent side of said fuselage,
    (c) each said wing having a substantially straight trailing edge swept outwardly and rearwardly with respect to the adjacent side of said fuselage and terminating at the rear extremity of said wing straight tip section, and
    a horizontal tail extending from each side of said fuselage,
    (a) each said horizontal tail having a straight leading edge swept outwardly and rearwardly with respect to the adjacent side of said fuselage,
    (b) each said tail having a straight tip section extending from the leading edge extremity thereof inwardly and rearwardly with respect to the adjacent side of said fuselage,
    (c) each said tail having a substantially straight trailing edge swept outwardly and rearwardly with respect to the adjacent side of said fuselage and terminating at the rear extremity of said tail tip section,
    each said tail being located in an aft position adjacent the aft end of said fuselage during aircraft takeoff and climb to cruise altitude, and
    means for translating each said tail forward as a unit for acceleration of the aircraft through the transonic speed range to the cruise Mach number so that upon attainment of the cruise Mach number said tail will have been moved forward to such position that the leading edge thereof is adjacent with said trailing edge of said wing to form a continuous lift surface.

2. The aircraft of claim 1 wherein said wind trailing edge and said tail straight leading edge are swept outwardly and rearwardly, at the same angular relationship with respect to the adjacent side of said fuselage and the length of said wing straight trailing edge and said tail straight leading edge are substantially identical.

3. The aircraft of claim 1 wherein when said tail is adjacent with said wing the straight tip sections of said tail and wing will also merge into a straight continuous tip section.

4. The aircraft of claim 1 wherein said wing trailing edge is blunt to facilitate the installation of sophisticated high lift devices for low speed flight and said tail leading edge reduces the wing base drag when said tail is adjacent to said wing for flight of said aircraft at the design cruise Mach number.

5. An aircraft having both supersonic and subsonic flight capabilities comprising:
    a fuselage,
    propulsion means carried by said fuselage,
    a fixed wing connected to each side of said fuselage and projecting substantially horizontally and outwardly therefrom,
    a horizontal tail extending from each side of said fuselage, said horizontal tail being located in an aft position adjacent the aft end of said fuselage during aircraft takeoff and climb to cruise altitude,
    and means for translating said horizontal tail forward along said fuselage as a unit for acceleration of the aircraft through the transonic speed range to the cruise Mach number so that upon attainment of the cruise Mach number said tail will have been moved so that the leading edge of said tail contacts the trailing edge of said wing.

6. The aircraft of claim 5 wherein said wing trailing edge is blunt along the length thereof and when said tail contacts said trailing edge a continuous lift surface is formed by said wing and said tail wherein the drag of the combination is reduced.

7. The aircraft of claim 6 including lonigtudinal control elevators positioned along the trailing edge of said tail.

References Cited

UNITED STATES PATENTS

| | | | |
|---|---|---|---|
| 2,504,767 | 4/1950 | Wallis | 244—46 |
| 2,683,574 | 7/1954 | Peterson | 244—46 |
| 3,092,355 | 6/1963 | Brown | 244—43 |
| 3,181,820 | 5/1965 | Burnelli | 244—87 |

FOREIGN PATENTS 1,124,991  7/1956  France.

MILTON BUCHLER, Primary Examiner

J. L. FORMAN, Assistant Examiner

U.S. Cl. X.R.

244—46, 87